(No Model.)
R. W. HOWELL.
COMBINED THILL COUPLING AND HORSE DETACHER.
No. 547,754. Patented Oct. 8, 1895.
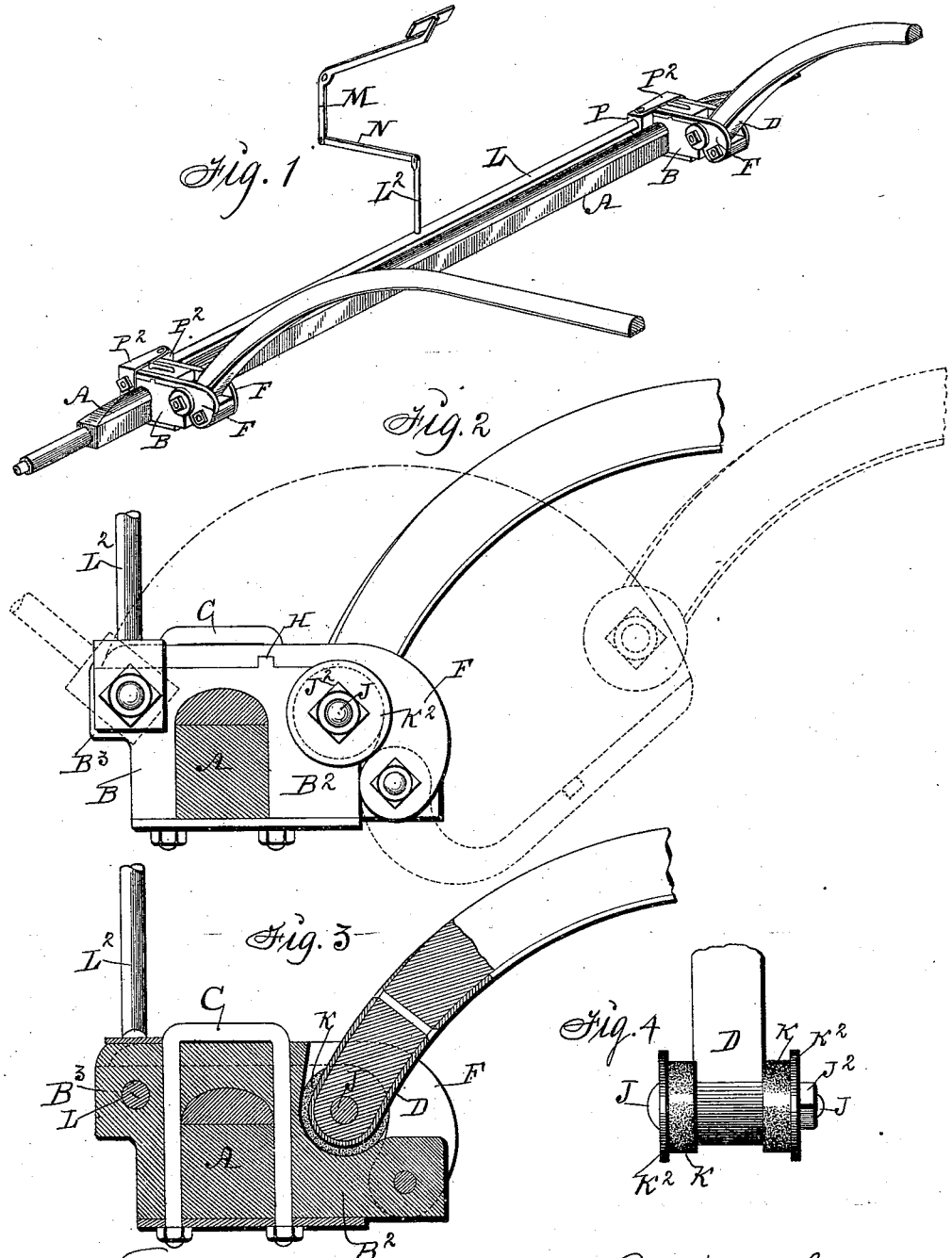

UNITED STATES PATENT OFFICE.

ROBERT W. HOWELL, OF INDIANOLA, IOWA.

COMBINED THILL-COUPLING AND HORSE-DETACHER.

SPECIFICATION forming part of Letters Patent No. 547,754, dated October 8, 1895.

Application filed March 2, 1895. Serial No. 540,376. (No model.)

*To all whom it may concern:*

Be it known that I, ROBERT W. HOWELL, a citizen of the United States of America, residing at Indianola, in the county of Warren and State of Iowa, have invented a new and useful Thill-Coupling and Horse-Detacher, of which the following is a specification.

My object is to provide means adapted for quickly and securely connecting thills to a vehicle, as required for hitching a horse thereto, and also adapted to be instantly detached, as required to free a horse from a vehicle and to prevent the dangers and accidents incident to persons in vehicles when runaways occur.

My invention consists in a thill-coupling and a device for uncoupling combined with a vehicle, as hereinafter set forth, pointed out in my claim, and illustrated in the accompanying drawings, in which—

Figure 1 is a perspective view of the front axle of a vehicle, showing my invention applied as required for practical use. Fig. 2 is an enlarged transverse sectional view of the axle and side view of my device securely attached to the axle. Fig. 3 is a central sectional view of Fig. 2. Fig. 4 is a detail view showing the end of a thill and elastic washers combined, as required to prevent rattling.

The letter A designates an axle, and B a coupling-iron adapted to be placed astride the axle and clamped fast thereto by means of a U-shaped bolt C and nuts on the ends of the bolt. An integral socket $B^2$ projects forward from the iron B on the axle and is adapted to receive the end of a thill-iron D, as clearly shown in Fig. 3.

$B^3$ is an integral extension at the front and center of the socket, to which are pivoted two mating elbow-shaped metal keepers F, by means of a bolt $F^2$, in such a manner that their free ends will overlap the top of the coupling B to retain the end of the thill-iron D in the socket $B^2$, as shown in Figs. 1 and 2. Notches in the under sides of the keepers F admit projections H on top of the iron B, to aid in retaining them in position when subjected to strain from force applied thereto from a horse hitched to the thills.

J is a bolt extended through the perforated end of the thill D and secured thereto by a nut $J^2$.

K are elastic washers, and $K^2$ metal disks placed on the bolt at the sides of the thill-iron in such a manner that when the socket $B^2$ and the keepers F are turned back upon the coupling-iron B their under edges will engage the elastic washers K and compress them, and the metal disks $K^2$ will overlap the sides of the socket $B^2$, as required to retain the thill-iron in the socket and to prevent noise or rattling, and when the keepers F are released the elastic washers will by their expansive force aid in lifting the keepers, thereby facilitating the detaching of the thills from a vehicle.

L is a rock-shaft in bearings $B^3$ at the rear ends of the two coupling-irons B, fixed to the axle A. It has an arm $L^2$ projecting upward from its central portion.

M is an elbow-shaped lever adapted to be pivoted to the body or floor of a vehicle, and its lower end connected with the arm $L^2$ by means of a link N in such a manner that foot-pressure on the free end of the lever will rock the shaft L in its bearings.

P are collars fixed on the end portions of the shaft L, and $P^2$ are elbow-shaped metal plates fixed thereto in such a manner that the screw-threaded ends of the shaft will extend through perforations in the plates, so that the parts can be retained in place on the shaft L and the plates moved by means of the rock-shaft, as required, to serve as a means of locking the free ends of the keepers F fast on top of the coupling-iron B, as shown in Fig. 1.

To connect shafts with a vehicle by means of my coupling device, when the keepers R are turned forward, as indicated by dotted lines in Fig. 2, I place the ends of the thill-irons D in the sockets $D^2$ and then turn the keepers F backward and lock them upon the coupling-irons B by means of the metal plates $P^2$ on the ends of the rock-shaft L.

To instantly detach the thills, as required for safety when a horse is ungovernable and running, simply depress the top and free end of the lever M, by foot-pressure or in any suitable way, to rock the shaft L, and thereby swing the metal plates $P^2$ rearward to free the keepers F, so that they can swing forward, as indicated by dotted lines in Fig. 2, so that the thill-irons D will escape from the sockets $B^2$.

From the foregoing detailed description of the construction and function of each part the practical operation and utility of my complete invention will be obvious to persons familiar with vehicles and the manner of hitching horses thereto.

I claim as my invention—

A thill coupling and horse detacher comprising coupling irons, having sockets at their front ends adapted to receive the ends of thill irons, fixed to a carriage axle, keepers pivoted to the front ends and sides of the sockets to extend upward and rearward, thill irons adapted to be detachably fastened in said sockets, a rock shaft extended parallel with the axle of a vehicle and supported in bearings at the rear ends of mating coupling irons, metal plates fixed to the end portions of the rock shaft and adapted to overlay and fasten the ends of said pivoted keepers and means for rocking the shaft, all arranged and combined to operate substantially as set forth.

ROBERT W. HOWELL.

Witnesses:
H. L. ROSS,
L. L. MOSHER.